United States Patent [19]

Allard

[11] 4,376,510
[45] Mar. 15, 1983

[54] WARNING DEVICE AND METHOD FOR A HEATING SYSTEM

[76] Inventor: Wayne H. Allard, 10304 Shesue St., Great Falls, Va. 22066

[21] Appl. No.: 260,933

[22] Filed: May 6, 1981

[51] Int. Cl.³ .......................................... G05D 23/00
[52] U.S. Cl. ..................................... 237/2 B; 62/129
[58] Field of Search ............... 237/2 B; 165/29, 11 R; 62/125, 126, 127, 130, 129; 236/94

[56] References Cited

U.S. PATENT DOCUMENTS

| | | | |
|---|---|---|---|
| 3,707,851 | 1/1973 | McAshan | 62/125 |
| 4,211,089 | 7/1980 | Mueller et al. | 62/126 |
| 4,246,763 | 1/1981 | Mueller et al. | 62/126 |

*Primary Examiner*—William R. Cline
*Assistant Examiner*—John F. McNally
*Attorney, Agent, or Firm*—Burns, Doane, Swecker & Mathis

[57] ABSTRACT

The present invention relates generally to a warning device and method for a heating system. More particularly, the present invention relates to a warning device for a heat pump system which warning device generates a warning signal for indicating an abnormal condition in the heat pump system. The abnormal condition may be either activation of an auxiliary heater or malfunction or failure of a compressor for the heat pump system. The device comprises three temperature sensing thermistors. A first thermistor is attached to a line delivering working fluid from the compressor. The second thermistor is arranged inside a hot air duct delivering heated air from the system downstream from the auxiliary heater to a space to be heated. The third thermistor measures the ambient air temperature within the space to be heated. Temperatures sensed by the three thermistors are compared in a control circuit. During normal operation, the temperature of the working fluid is greater than or equal to the temperature of the hot air which is greater than or equal to the temperature of the ambient air. When the compressor unit fails, the temperature of the hot air (which is being heated by a separate source) is greater than the temperature of the working fluid by a predetermined value and the working fluid temperature is greater than or equal to the ambient air temperature. When this condition is sensed by the control unit, a warning device is activated to inform the user of a compressor failure.

19 Claims, 3 Drawing Figures

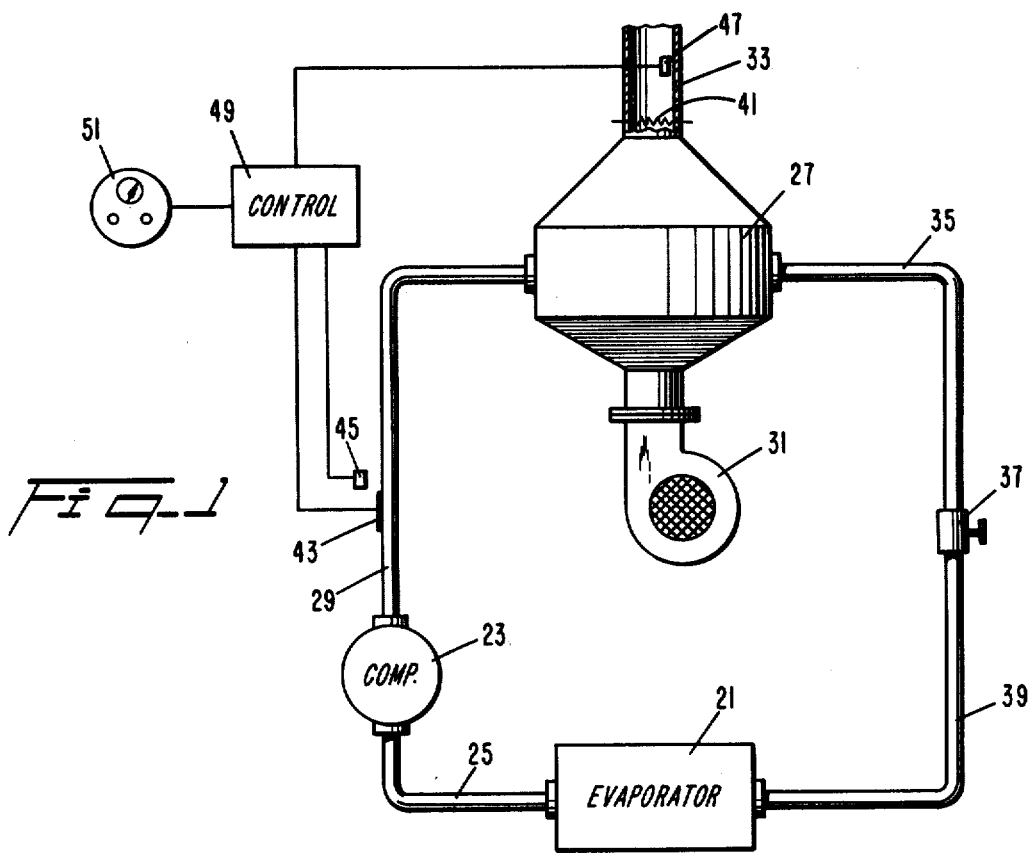
Fig-1
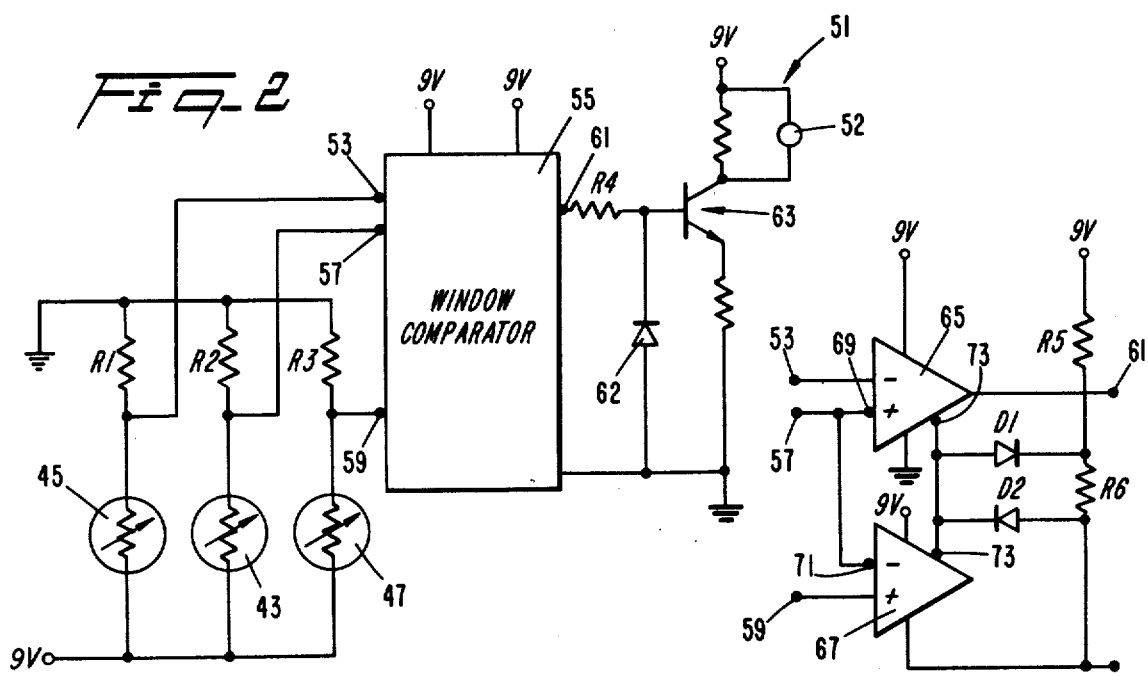
Fig-2
Fig-3

WARNING DEVICE AND METHOD FOR A HEATING SYSTEM

BACKGROUND AND SUMMARY OF THE PRESENT INVENTION

The present invention relates generally to a warning device and method for a heating system. More particularly, the present invention relates to a method and apparatus for indicating when a compressor for a heat pump system fails.

In known heat pump systems it is customary to provide an auxiliary or supplemental heater, usually an electric resistance heater, which is activated to supplement the heat produced by the heat pump system. It is typical to have the auxiliary heater activated by a second thermostat set at a predetermined number of degrees below the setting of a primary thermostat which activates the heat pump system. However, a device for indicating that the auxiliary heater has been activated is not ordinarly provided. Also, the auxiliary heater may be required to provide substantially all of the heat for a space to be heated in the case of a compressor failure within the heat pump system. In the absence of a warning device, the owner of the system has no reason to suspect any malfunction within the heating system since the temperature within the space to be heated is maintained at a desired temperature.

In view of the rapidly increasing cost of energy, it is desirable to provide a warning device which indicates when the compressor has failed so that proper servicing can be obtained. It is further desirable to provide a warning device which is only actuated during a compressor malfunction or failure. In other words, a warning system should not indicate a malfunction when the auxiliary heater is activated merely as a supplement to the heat pump system due to an extremely low outside air temperature for which the heat pump system is incapable of transferring sufficient heat to the space to be heated.

Warning devices for indicating compressor malfunction or failure within a heat pump system are apparently not known. Warning devices for other systems requiring temperature modulation are known which systems rely upon various temperature differentials. One such arrangement provides a monitor for indicating undesirable conditions within a refrigeration system. The arrangement comprises a pair of thermistors which sense two different temperatures which have a known relationship within the system, for example, the ambient air temperature and the temperature of the refrigerant. A first alarm signal is produced when the difference between these temperatures exceeds a predetermined value, and a second alarm signal is produced when the difference between these two temperatures is less than the predetermined value. A device of this type is disclosed in U.S. Pat. No. 3,707,851 issued Jan. 2, 1973 to McAshan, Jr. It is submitted that a device of this type is not readily adaptable to a heat pump system for indicating compressor failure in the system.

A further proposed device for providing corrective measures in the case of a temperature imbalance within a system comprises a device for preventing overheating of an automobile engine particularly when an air conditioning system is driven by the engine. A controller receives temperature data from two sensors. A first temperature sensor consists of a thermostat mounted in the radiator of the engine which sensor continuously monitors the temperature of the engine coolant. A second temperature sensor is attached to the surface of a conduit leaving a condenser for the air conditioning system. When either or both of the signals exceeds a predetermined maximum value, the controller actuates a pump which sprays water directly onto the condenser to cool the condenser of the air conditioning system. A system of this type is disclosed in U.S. Pat. No. 3,926,000 issued Dec. 6, 1975 to Scofield.

Other warning device systems are disclosed in U.S. Pat. Nos. 2,439,331 issued Apr. 6, 1948 to Bean and 2,617,867 issued Nov. 11, 1952 to Welch. These patents relate generally to devices which produce a warning signal if the temperature in the refrigeration system exceeds a predetermined value or if the electricity to the system is cut off.

It is an object of the present invention to provide a simple and effective warning device for a heating system which indicates an abnormal condition within the heating system.

It is a further object of the present invention to provide a warning device for a heat pump system which is effective to indicate that a compressor in the heat pump system has failed or to indicate that an auxiliary heater has been activated but does not indicate a malfunction when the heat pump system is in a cooling mode.

Still a further object of the present invention is to provide a warning device for a heat pump system which can be readily installed by a home owner on an existing heat pump system without requiring the use of special tools or knowledge.

Still a further object of the present invention is to provide a heat pump warning device which is relatively low in cost and is effective to constantly monitor the operation of the heat pump system.

These objects and many others are achieved by a warning device adapted particularly for use with a heat pump system including an auxiliary heater arranged in an outlet duct for heated air from the system. The warning device includes a first temperature sensor adapted for indicating the temperature of a working fluid for the heat pump system leaving a compressor for the system. A second sensor is adapted for indicating the temperature of heated air in the outlet duct downstream from the auxiliary heater. A third sensor is adapted for indicating the temperature of ambient air in a space to be heated. A comparator is provided for comparing the three sensed temperatures and for activating a signal when the comparator indicates that the heated air temperature is greater than the working fluid temperature which is greater than or equal to the ambient air temperature.

According to a preferred embodiment of the present invention, the comparator comprises a window comparator with an upper limit set by the heated air temperature and a lower limit set by the ambient air temperature. In this way, a signal indicating either activation of the auxiliary heater or a compressor malfunction is activated whenever the working fluid temperature falls within the prescribed window.

A further aspect of the present invention includes an arrangement for preventing activation of the warning signal when the auxiliary heater is activated only to supplement the heat pump system. According to a further feature of the present invention, the warning device is activated separately from the heat pump system whereby the warning signal can remain in the indicating condition for a period of time after deactivation of the heat pump system. Still further according to the preferred embodiment each of the temperature sensors comprises a thermistor the voltage across which varies with a change in temperature. The warning signal may be either audible, visual or both audible and visual.

BRIEF DESCRIPTION OF THE DRAWINGS

Preferred embodiments of the present invention will be described in greater detail with reference to the accompanying drawings, wherein like members bear like reference numerals and wherein:

FIG. 1 is a schematic view of a warning device according to the present invention attached to a heat pump system;

FIG. 2 is a schematic circuit diagram of the warning device according to the present invention; and FIG. 3 is a detail view of one embodiment of the window comparator of the circuit illustrated in FIG. 2.

DETAILED DESCRIPTION OF THE PREFERRED EMBODIMENTS

With reference to FIG. 1, a heat pump system includes an evaporator 21 of known construction. In the heating mode, the evaporator 21 removes heat from the outside air and delivers the heat to a working fluid within the heat pump system to at least partially vaporize the working fluid. The working fluid may be and standard compound such as Freon-12. From the evaporator 21, the working fluid, substantially in a gaseous state, is delivered to a compressor 23 in a line 25. The compressor 23 increases the temperature and pressure of the gaseous working fluid and delivers the hot pressurized gas to a condenser 27 in a line 29.

A blower 31 is arranged to force a flow of air across the coil (not shown) within the condenser 27 to remove heat from the working fluid within the coil. It should be noted that the blower 31 while illustrated as forcing air across the condenser coil may conveniently be arranged on an opposite side of the condenser 27 to pull air through the condenser coil. The air directed across the coil of the condenser 27 by the blower 31 is heated and delivered in an outlet duct 33 to a space 35 to be heated. The working fluid, having been at least partially condensed within the condenser 27 due to the removal of heat therefrom, exits from the condenser 27 in a line 35. The working fluid is then passed through a conventional expansion valve 37 to reduce the pressure of the working fluid. The working fluid is then delivered in a line 39 to the evaporator 21 to absorb heat from the outside environment as described above.

This cycle continues as long as a first thermostat (not shown) arranged within the space 35 indicates that the temperature within the space 35 is below the desired level. When the temperature within the space 35 reaches the level set on the first thermostat, power to the compressor and blower is terminated and the heat pump system is at rest.

In a conventional heat pump system, an auxiliary electric resistance heater 41 is generally arranged within the outlet duct 33 for the heated air from the heating system. The auxiliary heater 41 is provided particularly for extremely cold outside environmental conditions when the heat pump system cannot absorb enough heat from the cold outside environment to effectively heat the space 35 to the desired temperature. In one conventional system, the electric resistance heater 41 is actuated by a second thermostat (not shown) arranged within the space 35. The second thermostat is generally set a predetermined number of degrees below the setting of the first thermostat which actuates the heat pump system. In a typical system, the second thermostat is set between 2° and 7° F. below the first thermostat. In this way, when the temperature within the space falls below the setting of the first thermostat by the predetermined amount, the auxiliary heater 41 is activated to supplement the heat obtained from the heat pump system.

However, if the compressor malfunctions or fails completely, even on a day when the outside air conditions are not so extreme that the heat pump system is incapable of providing sufficient heat, the electric resistance heater 41 will be activated. In known systems, there is no indication when the electric resistance heater 41 is activated and hence the owner of the heat pump system may be unaware of the activation of the electric resistance heater 41 until receiving a electric bill at the end of the month which is higher than normal.

According to the present invention, a warning device is arranged to indicate when a compressor malfunction or failure occurs. The warning device according to the present invention includes three temperature sensors. A first sensor 43 for measuring the temperature of the working fluid is preferably arranged on an outside of the line 29 delivering compressed gaseous working fluid to the condenser 27 from the compressor 23. Such a temperature sensor in the form of a thermistor is readily available commerically and can be easily attached to an outside wall of the line 29 without requiring any special tools. A second temperature sensor 45 is arranged to measure the temperature of the ambient air in the general vicinity of line 29 and the first sensor 43. The second sensor 45 is provided, among other reasons, as a control to prevent actuation of the alarm or warning device when the heat pump system according to the present invention is in the cooling mode during warmer months of the year. A third temperature sensor 47 is arranged within the heated air duct 33 downstream of the electric resistance heater 41 for measuring the temperature of the heated air being delivered to the space 35. Each of the temperature sensors is preferably a thermistor whose output voltage varies with a change in temperature.

Each of the temperatures sensed by the three sensors 43, 45, 47 is delivered to a control unit 49 which compares or evaluates the three temperatures to determine when the relationship between the temperatures indicates that an abnormality in the heating system exists. When such a condition exist, the control unit 49 activates an indicator 51 to signal to the owner that the abnormality has occurred. The indicator 51 may be of any known variety, for example, a light, a buzzer, a meter or any combination thereof.

During normal operation of the heat pump system in the heating mode, the temperature of the working fluid within the line 29 is greater than or equal to the temperature of the heated air within the outlet duct 33. Further, the temperature of the heated air in the duct 33 is greater than the ambient temperature in the space 35. The temperature of the heated air in the duct 33 may be less than the temperature of the working fluid in the line 29 due to less than 100% heat transfer between the air directed by the blower 31 across the coil of the condenser 27 and the working fluid within the condenser coil.

When the compressor 23 malfunctions or fails, and heat is still required within the space 35, the auxiliary electric resistance heater 41 is activated. The activation of the electric resistance heater 41 changes the above temperature relationship. In particular, with the electric resistance heater 41 operating, the air temperature in the duct 33 is greater than the temperature of the working fluid within the line 29. The temperature in the line 29 is greater than or equal to the ambient temperature measured by the sensor 45. When this temperature relationship exists, the indicator 51 is activated to alert the owner of an abnormality in the heat pump system.

It should be noted that a similar temperature relationship will occur both during extremely cold weather when the heat pump system cannot deliver sufficient heat to the space 35 due to the extremely low temperature of the outside air and when the compressor 23 malfunctions or fails. The inability of the heat pump system to deliver sufficient heat causes the second thermostat to activate the auxiliary electric resistance heater 41. After the heater 41 is activated, the temperature of the heated air in the duct 33 downstream of the heater 41 will rise above the temperature of the working fluid in the line 29.

However, when the electric resistance heater 41 is merely used to supplement the heat generated by the heat pump system, the temperature differential between the temperature of the heated air in the duct 33 and the working fluid temperature within the line 29 is much smaller than the differential that occurs when the compressor 23 fails completely. The warning device according to the present invention may be arranged to indicate whenever the electrical resistance heater is activated. Alternatively, the warning device is preferably arranged such that the temperature differential between the temperature of the heated air in the duct 33 and the temperature of the working fluid in the line 29 must be greater than the differential which normally occurs when the electric resistance heater 41 is used to supplement the heat pump system. In this way, the warning device only indicates when the compressor 23 has malfunctioned or failed completely.

With reference to FIG. 2, a preferred embodiment of the warning device according to the present invention includes a source of power independent of the source of power for the heat pump system. In this way, if a compressor malfunction occurs, the signal indicated by the warning device is maintained for a short period of time after the heat pump system has been deactivated by the first thermostat after the desired temperature within the space 35 has been obtained. This extended actuation is due to the fact that the temperatures sensed by the sensors 43, 45, 47 will be maintained for a period of time after deactivation of the heat pump system until temperature equilibrium is established. The delayed deactivation of the warning signal permits a user of the system to be informed of a malfunction even after the heat pump system has been shut down. This is particularly useful if the indicator 51 is arranged at a location where the user is not always present.

The thermistors which are preferred for use as the sensors 43, 45, 47 have the advantage of being both rugged in construction and easy to install at the appropriate locations. Each of the thermistors is of conventional design and produces an output voltage which varies with changes in temperature. It should be noted that the thermistors do not record an absolute temperature reading but rather indicate relative temperature readings between the various locations. The second thermistor 45 which measures ambient air temperature is connected in series with a suitable resistor R1 across the power source to form a voltage divider, while the first thermistor 43 which measures the working fluid temperature in the line 29 is connected in series with a suitable resistor R2 to form another voltage divider in parallel with the first voltage divider. The third thermistor which indicates the heated air temperature in the duct 33 is connected in series with a suitable resistor R3 to form a third voltage divider connected across the power source.

The voltage at the junction of the voltage divider including the second thermistor 45 is fed to a first input 53 of a window comparator 55. The voltage at the junction of the voltage divider including the first thermistor 43 is fed to a second input 57 of the window comparator 55 while the voltage at the junction of the voltage divider including the third thermistor 47 is fed to a third input 59 of the window comparator 55.

The window comparator 55 receives the three inputs with the first input 53 which indicates ambient air temperature operating as the low limit on the window comparator 55 and the third input 59 to the window comparator 55 which input receives the voltage from the third thermistor 47 indicative of the heated air temperature serving as the upper limit of the window comparator 55. The voltage value obtained from the first thermistor 43 and representative of the temperature of the working fluid is the variable which must fall within the prescribed upper and lower limits. When the voltage applied to the second input 57 falls between the upper limit voltage at the third input 59 and the lower limit voltage at the first input 53, a high output signal is generated by the window comparator at an output 61. This output voltage is delivered through a suitable resistor R4 to a base of a medium power switching transistor 63. The switching transistor 63 is driven to saturation when the output 61 is high thereby turning on the transistor 63. Power is then supplied to the indicator 51 to activate a signal 52, e.g., an alarm, buzzer, light, meter or the like. A clamping diode 62 prevents a possible emitter-base voltage breakdown of the transistor 63.

As noted above, during normal operation of the heat pump system in the heating mode, the temperature, and hence the voltage, indicated by the thermistor 43 is greater than the temperature, and hence the voltage, indicated by the thermistor 47 in the air duct 33. In such a case, the window comparator output is low and the transistor 63 is not switched to the on condition. Also, it should be noted that when the heat pump system is operating in a cooling mode, the temperature, and hence the voltage, indicated by the first thermistor 43 on the line 29 is lower than the temperature, and hence the voltage, indicated by the ambient air thermistor 45. Accordingly, the voltage indicated by first thermistor lies outside the "window" and the window comparator 55 continues to deliver a low level signal at the output 61. Consequently, the transistor 63 is not switched to the on condition when the heat pump system is in the cooling mode. In other words, the ambient air low limit acts as a control to prevent actuation of the signal when the heat pump system is in the cooling mode. It should be noted that compressor failure in the cooling mode will be readily apparent to the user since the temperature in the space 35 rises.

If the compressor fails and additional heat is required in the space 25, the temperature of the working fluid in the line 29 as sensed by the first thermistor 43 is less than the temperature of the air in the duct 33 as measured by the third thermistor 47. The higher temperature of the air in the duct 33 is due to the activation of the electric resistance heater 41. Also, the temperature of the working fluid in the line 29 is greater than or equal to the ambient air temperature sensed by the second thermistor 45. In this case, the voltage applied to the second input 57 to the window comparator 55 falls within the "window" between the voltages at the first input 53 and the third input 59 such that a high level signal is generated at the comparator output 61. This output is sufficient to drive the transistor 63 to saturation and to cause the signal 52 to indicate a malfunction.

The resistances R1, R2, R3 may be selected in two ways. If the resistances R1, R2, R3 are given values that are approximately equal to one another, the voltage generated by each of the thermistors 43, 45, 47 will vary by an amount approximately equal to one another for a given temperature change. In this way, a small change in any one of the thermistors will change the corresponding input voltage to the window comparator 55 a correspondingly small amount. By arranging the resistors R1, R2, R3 in this manner, the indicator 51 will be activated even when the auxiliary electric resistance heater 41 is activated merely to supplement the heat generated by the heat pump system. In other words, the indicator 51 will indicate not only a compressor failure but also the activation of the auxiliary electric resistance heater 41 when the outside air temperature is too cold for the heat pump system to deliver sufficient heat to the space 35. It should be noted that a simple indicator directly activated by the second thermostat which controls the auxiliary heater 41 could be employed to indicate activation of the auxiliary heater 41.

Alternatively, by providing a considerably higher value for the resistor R2, the voltage at the junction of the voltage divider including the first thermistor 43 will not change appreciably with small changes in the temperature of the working fluid within the line 29. In this way, the warning device according to the present invention activates the indicator 51 only when the heated air temperature in the outlet duct 33 is substantially higher than the working fluid temperature within the line 29. Such a substantial temperature difference occurs only when the compressor 23 has malfunctioned or failed completely and the electric resistance heater 41 has been activated thereby supplying substantially all of the heat to the space 35. Accordingly, the warning device according to the present invention can be adapted to the particular desire of the owner.

With reference to FIG. 3, one embodiment of the window comparator 55 suitable for use in the present invention includes two intergrated circuit operational amplifiers (op-amps) 65, 67 which function as an internally gated window comparator. The output 61 of the upper op-amp 65 generates a high output level only if the voltage applied to the non-inverting input terminal 69 (connected to the second input 57) and the voltage applied to the inverting input terminal 71 of the lower op-amp 67 (also connected to the second input 57) falls within the voltage window set by the lower limit determined by the voltage applied at the first input 53 and the upper limit determined by the voltage applied to the third input 59.

The window effect is achieved since the source and the sink currents available at bias terminals 73 of the upper and lower op-amps are unequal. In particular, the absolute value of the negative drive of each of the op-amps is greater than the positive drive of the respective op-amp. Accordingly, the voltage at the bias terminal 73 of the upper op-amp 65 will be low if the comparison of the input signals to either op-amp 65 or op-amp 67 results in a low indication. In other words, for the voltage at the output 61 of the upper op-amp 65 to be high, both op-amp 65 and op-amp 67 must have a high output condition. The outputs of both op-amp 65 and op-amp 67 will follow the bias terminals 73 since the op-amps internal circuitry has unity gain.

The diodes D1 and D2 form a clamping network. The clamping network operates by selecting the values of resistances R5 and R6 at the proper level to clamp the positive output of the op-amps 65, 67. This clamping arrangement provides essentially a square wave-type signal input to the transistor 63. In a preferred embodiment, the resistances R5 and R6 provide approximately a 2.2 volt bias for the diode D1 thereby clamping the positive voltage at the output 61 to 2.5 volts. In such a case, the diode D2 limits the negative output excursion to $-0.5$ volts.

In one operative embodiment of the present invention, the following resistance values are employed.

| Resistor | Ohms |
| --- | --- |
| R1 | 100k |
| R2 | 1.5m |
| R3 | 150k |
| R4 | 4.7k |
| R5 | 4.7k |
| R6 | 27k |

The diodes were each selected to be IN914 type. The transistor 63 is a GE20. The thermistor 45 is a Vepco 51R6; the thermistor 43 is a Vepco 61A2; and the thermistor 47 is a Vepco 51A37.

The present invention provides a simple yet effective warning device for indicating when a compressor in a heat pump system has failed. In addition, the warning device according to the present invention can be easily installed by the user without the use of the special tools or special knowledge of the heat pump system itself. Further, the warning device according to the present invention can be used to indicate whenever an electric resistance heater is activated to supplement the heat from the heat pump system if desired. It should be noted that the present invention has been described with reference to a particular heat pump system. However it is to be understood that the warning device according to the present invention may be readily adaptable to other heating systems which employ an auxiliary heater.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A warning device for a heat pump system comprising:

duct means for delivering heated air heated in the system to a space to be heated;

auxiliary heater means in said duct means, said auxiliary heater means being activated when the temperature in said space drops below a predetermined value;

means for sensing the temperatures of the ambient air around the heat pump system, the working fluid of the heat pump system downstream of a compressor for the heat pump system, and the heated air in the duct means downstream of said auxiliary heater means;

means for evaluating said temperatures;

warning means for indicating when said heated air temperature is greater than the working fluid temperature and the working fluid temperature is greater than or equal to the ambient air temperature.

2. The warning device according to claim 1, wherein the means for evaluating said temperatures comprises a window comparator having the heated air temperature as an upper limit and the ambient air temperature as a lower limit.

3. The warning device according to claim 1, wherein the means for sensing the temperatures comprises:
a first thermistor arranged on a line carrying the working fluid;
a second thermistor arranged in the space; and
a third thermistor arranged in the duct means 4. The warning device according to claim 1, wherein the warning means comprises a visual signal.

5. The warning device according to claim 1, wherein the warning means comprises an audible signal.

6. The warning device according to claim 1, wherein the warning device is activated separately from the heat pump system whereby the warning means is permitted to remain in the indicating condition for a period of time after deactivation of the heat pump system.

7. The warning device according to claim 1, further comprising means for prohibiting an indication by the warning means when the temperature of the working fluid is only slightly less than the temperature of the heated air whereby malfunction or failure of the compressor is indicated.

8. A method for indicating abnormal operation of a heat pump system comprising the steps of:
sensing the ambient air temperature surrounding the heat pump system;
sensing the temperature of working fluid delivered from a compressor in the heat pump system;
sensing the temperature of heated air delivered to a space to be heated from the heat pump system downstream of a supplemental heater;
comparing the three sensed temperatures; and
signalling when the heated air temperature is greater than the working fluid temperature and the working fluid temperature is greater than or equal to the ambient air temperature, said signal indicating either that the supplemental heater has been activated or that the compressor has malfunctioned or failed.

9. The method according to claim 8, further comprising the step of preventing signalling when the heated air temperature is only slightly greater than the working fluid temperature whereby malfunction or failure of the compressor is indicated.

10. Warning device for a heating system comprising:
compressor means for delivering hot working fluid to a heat exchange means;
means for flowing air in heat exchange relationship with the hot working fluid within the heat exchange means;
an outlet duct means for delivering air heated in the heat exchange means to a space to be heated;
auxiliary heater means arranged in said outlet duct means, said auxiliary heater being activated when the air temperature in said space drops below a predetermined value;
means for sensing the temperature of said working fluid leaving said compressor means;
means for sensing the temperature of the ambient air surrounding the heat pump system;
means for sensing the temperature of the heated air in the outlet duct means downstream from said auxiliary heater means;
control means for comparing the sensed temperatures of the working fluid, the ambient air, and the heated air in the outlet duct means; and
warning means for signalling when the control means indicates an abnormal condition in said heating system.

11. The warning device according to claim 10, wherein the abnormal condition is activation of the auxiliary heater means.

12. The warning device according to claim 10, wherein the abnormal condition is compressor means malfunction or failure.

13. The warning device according to claim 10, wherein the control means comprises a window comparator having the heated air temperature as an upper limit and the ambient air temperature as a lower limit.

14. The warning device according to claim 13, wherein the window comparator indicates that the compressor means has failed when the working fluid temperatures falls within the upper and lower limits.

15. The warning device according to claim 10, wherein the control means indicates that the compressor means has failed when the hot air temperature is greater than the working fluid temperature by a predetermined amount and the working fluid temperature is greater than or equal to the ambient air temperature.

16. Warning device for use with a heat pump system having an auxiliary heater arranged in an outlet duct for heated air from the system, said device comprising:
first sensor means adapted for indicating the temperature of working fluid leaving a compressor for the heat pump system;
second sensor means adapted for indicating the temperature of heated air in the outlet duct downstream from said auxiliary heater;
third sensor means adapted for indicating the temperature of ambient air surrounding the heat pump system;
means for comparing the three sensed temperatures; and
indicator means for signalling when the means for comparing indicates that the hot air temperature is greater than the working fluid temperature and that the working fluid temperature is greater than or equal to the ambient air temperature.

17. The warning device according to claim 16, wherein the means for comparing the three sensed temperatures comprises a window comparator being adapted to have the heated air temperature as an upper limit and the ambient air temperature as a lower limit.

18. The warning device according to claim 16, wherein each of the first, second and third sensor means comprises a thermistor.

19. The warning device according to claim 16, further comprising means for prohibiting a signal by the indicator means when the temperature of the working fluid is only slightly less than the temperature of the heated air whereby malfunction or failure of the compressor is indicated.

* * * * *